(No Model.) 2 Sheets—Sheet 1.

L. F. TRINCHARD.
CAR FENDER.

No. 538,936. Patented May 7, 1895.

WITNESSES:
John A Rennie
Fred Acker

INVENTOR
L. F. Trinchard
BY
Munn & Co
ATTORNEYS.

(No Model.) 2 Sheets—Sheet 2.

L. F. TRINCHARD.
CAR FENDER.

No. 538,936. Patented May 7, 1895.

WITNESSES:
John A. Rennie
J. Fred. Acker

INVENTOR
L. F. Trinchard
BY
Munn & Co.
ATTORNEYS.

UNITED STATES PATENT OFFICE.

LOUIS F. TRINCHARD, OF NEW ORLEANS, LOUISIANA, ASSIGNOR OF ONE-THIRD TO FREDERICK QUERENS, JR., OF SAME PLACE.

CAR-FENDER.

SPECIFICATION forming part of Letters Patent No. 538,936, dated May 7, 1895.

Application filed January 2, 1895. Serial No. 533,602. (No model.)

*To all whom it may concern:*

Be it known that I, LOUIS F. TRINCHARD, of New Orleans, in the parish of Orleans and State of Louisiana, have invented a new and improved Car-Fender, of which the following is a full, clear, and exact description.

My invention relates to an improvement in car fenders, and it has for its object to so construct the fender proper that it will be light, durable and economic, and whereby the said fender may be expeditiously and conveniently transferred from one end of a car to the other without the necessity of removing bolts or like fastening devices, a latch only being employed to hold the fender in position beneath the car, which latch is a fixture on the car.

Another object of the invention is to provide a device for raising and lowering the fender, which will consist of but few parts and will be exceedingly compact, the said device being placed close to the dashboard and consequently out of the way of the motorman, gripman and passengers.

Another object of the invention is to construct the fender and its supports in such a way that the same may be connected or disconnected expeditiously and conveniently, and whereby further both the fender and its supports will be clear of the tracks, bumpers and drawheads of the car, the fender being especially designed for use upon electrically propelled or upon cable cars.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
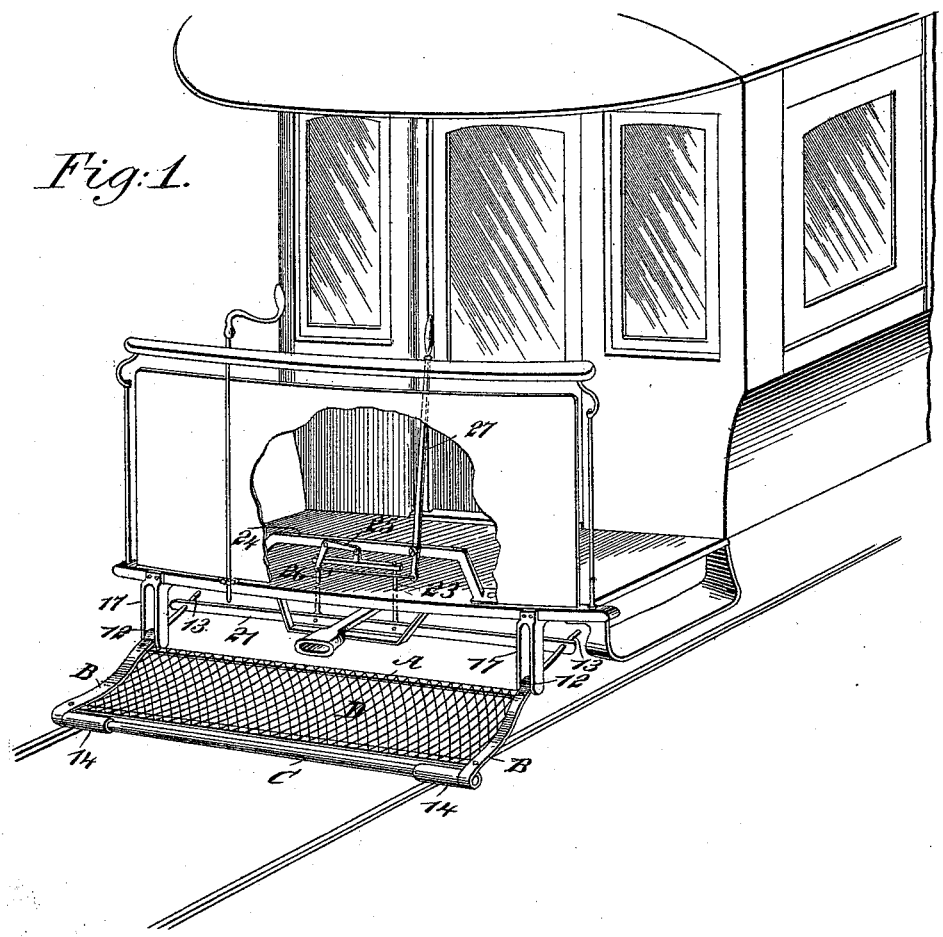
Figure 2:
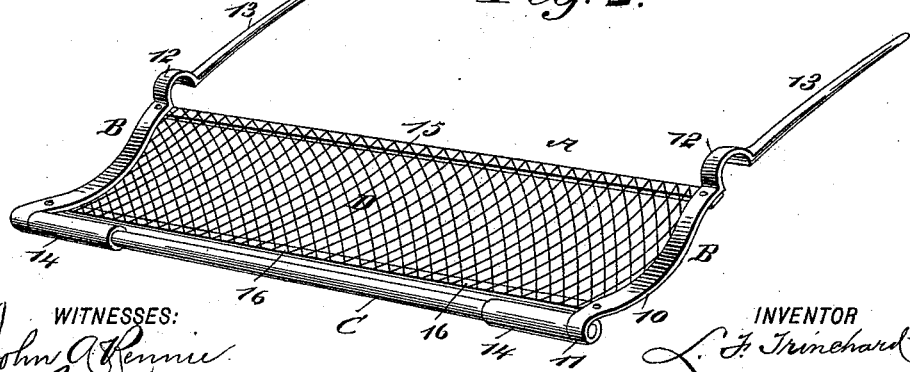
Figure 3:
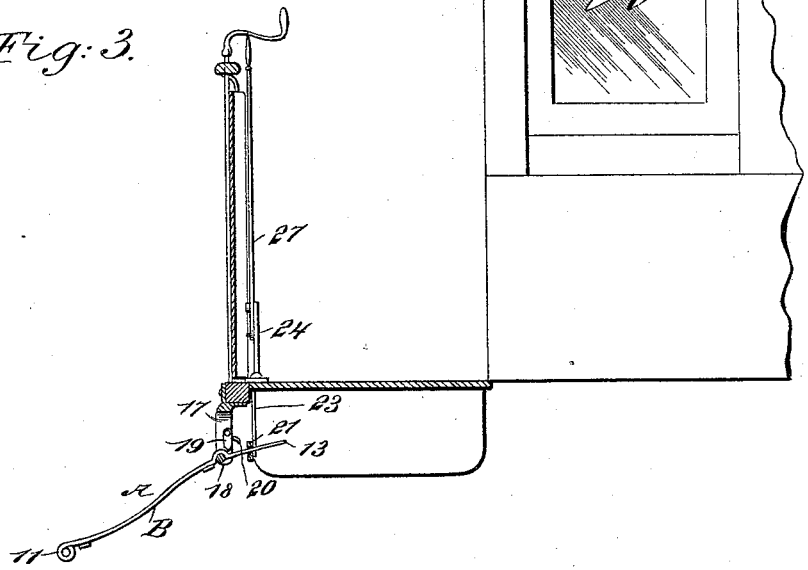
Figure 4:
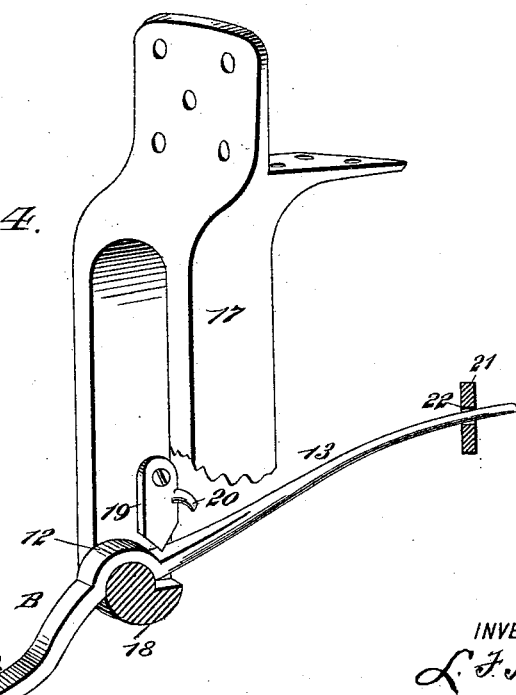

Figure 1 is a perspective view of a portion of the car, the dash being partly broken away, and likewise a perspective view of the fender and the device employed for manipulating the same. Fig. 2 is a perspective view of the fender removed from the car. Fig. 3 is a vertical section through the platform of a car and the support for the fender, the fender being shown in end view; and Fig. 4 is a detail perspective view of one of the hangers for the fender, a portion of said hanger being broken away, and likewise a sectional view of the rear support for the fender, together with a perspective view of the lock-latch and a perspective view of one of the end bars of the fender.

In carrying out the invention the fender A is what may be termed a basket fender, and its main frame consist of two end bars B and a front bar C, the end bars B comprising a body section 10, which is provided at its outer end with an eye 11, and the upper surface of this body section is concaved from the eye a predetermined distance rearward, from whence the said upper surface is convexed, forming a compound curve, the concaved portion being the longest, and preferably the under face of this, the body section of the end bar, is curved the exact reverse to the upper face. In the further formation of an end bar a central or intermediate socket section 12, is provided, which is open at the bottom, the said socket section being practically of semi-circular shape; and from the rear of the socket section an extension arm 13 is projected, and said extension arm may be of any cross sectional shape.

The front bar C of the fender frame is preferably cylindrical or circular in cross section, and is held at its ends in the eyes 11 of the end bars B; and adjacent to the eye of each end bar a thimble or friction roller 14 is mounted to turn upon the front bar, adapted when the fender is lowered to travel upon the rails, as shown in Fig. 1. These rollers are intended to prevent the sudden jar which may occur otherwise in bringing the fender down suddenly to the track, and also to secure smooth movement of the fender after having been lowered, and by having the reduced surface between the thimbles or rollers the fender may pass unobstructed over a newly paved surface between the rails, or will pass readily any slight projection from such a surface.

The body itself is completed by adding to the body frame B a receiving section D, and this receiving section consists of an upper cross bar 15, attached preferably to the under faces of the body sections of the end bars B, adjacent to or just in front of their sockets 12; and a second cross bar 16, attached likewise to the body sections of the end bars B, preferably close to the front bar C of the main frame.

The bars 15 and 16 constitute an auxiliary frame to which is secured a basket surface preferably made of woven wire or like material, the wire being secured to the cross bars and made to conform in cross section to the shape of the body sections of the said end bars of the main frame. Thus it will be observed that the body of the fender is given a gradual inward and upward curve from the front to the back.

A hanger 17 is secured to the under face of each platform of a car, one hanger back of each step, or one near each end of the platform, as shown in Fig. 1. These hangers are bifurcated, or substantially U-shaped, the members being connected at the bottom by a pivot bar 18, the front portion of the top whereof is cylindrical while the rear portion is straight, as shown in Fig. 4; and immediately above the pivot bar of each hanger a latch 19, is located, being pivoted to the inner face of one of the members of the hanger, and the said latch hangs normally in a vertical position, and its lower edge is beveled from the center in direction of opposite sides. The latch is provided with a spur 20 upon its rear edge, whereby it may be readily carried from a vertical to a substantially horizontal position.

At the back of the hanger a suspension bar 21 is located beneath each platform. This suspension bar is provided at or near each end with an opening 22 to receive within it the extension arms 13 of the fender proper. At or near the center of the suspension bar a yoke 23, or the equivalent thereof, is firmly secured, the vertical members of which yoke extend upward through suitable apertures in the platform of the car, having free movement therein, the apertures being made quite close to the dashboard of the platform.

A bridge bar 24 is located substantially over the yoke 23, being likewise secured to the platform, and upon this bridge bar an elbow lever 25 is fulcrumed, one member whereof is pivotally connected with the upper central portion of the yoke 23, while the opposite end of the said elbow lever, through the medium of a rod 26, is connected with the lower end of a hand lever 27, likewise fulcrumed on the bridge bar, as shown in Fig. 1, the hand lever extending upward a sufficient distance to be manipulated as readily as the brake handle.

The fender is placed in position in the following manner: The extension arms are passed between the members of the hangers 17 and into and through the openings 22 in the suspension bar at the rear of the hangers, until the socket sections of the fender receive within them the cylindrical portions of the pivot bars 18 of the hangers, as shown in Fig. 4, whereupon the latches 19, which on introducing the fender were pushed rearward, will graviate to their normal position and will prevent the fender from slipping from its support.

It will be readily observed that the fender may be transferred expeditiously and conveniently to the opposite end of the car, since all that is necessary is to raise the latches 19 and draw the fender out from its supports.

The fender may be raised or lowered as desired, by simply moving the hand lever 27 to the right or to the left.

Having thus described my invention, I claim as new and desire to secure by Letters Patent—

1. A car fender, the same consisting of a basket-like body having end bars provided with sockets at the rear of said body, and rearward extensions from said sockets, as and for the purpose set forth.

2. A car fender, the same comprising a basket body, a frame supporting said body, consisting of end bars and a front bar, the end bars at their connection with the body being curved and provided at the back of the body with sockets, and rearward extensions from said sockets, as and for the purpose set forth.

3. In a car fender, the combination with hangers having openings therein, of a fender having its end bars projecting through the hangers and provided with sockets fitting on the bottoms of the openings of the said hangers, and latches carried by the hangers and engaging the end bars of the fender to hold them in position in the hangers, substantially as described.

4. In a car fender, the combination with hangers having openings therein, of a fender having its end bars provided with sockets fitting on the bottoms of the openings of the hangers, and latches pivoted to the hangers and having their lower edges beveled, said latches engaging the upper surfaces of the end bars of the fender, substantially as described.

5. In a car fender, the combination with hangers, and a fender having its end bars mounted in the hangers and projecting rearwardly beyond the same, of a suspension bar to which the ends of the end bars of the fender are secured, a suspension yoke carried by said bar, a hand lever, and means for operating the suspension yoke from the hand lever, substantially as described.

6. In a car fender, the combination with hangers, and a fender having its end bars mounted in the hangers and projecting rearwardly beyond the hangers, of a suspension bar to which the end bars of the fender are secured, a suspension yoke carried by the bar, a pivoted elbow lever having one end pivotally connected with the suspension yoke, a hand lever, and a rod connecting the other end of the elbow lever with the hand lever, substantially as described.

LOUIS F. TRINCHARD.

Witnesses:
L. DE GOORTER, Jr.,
DAMOS DE MURSAY.